United States Patent [19]

Monteith

[11] 4,191,270
[45] Mar. 4, 1980

[54] CONTROL FOR TRACTOR POWER TAKEOFF SHAFT

[75] Inventor: Donald A. Monteith, Fargo, N. Dak.

[73] Assignee: Steiger Tractor, Inc., Fargo, N. Dak.

[21] Appl. No.: 829,642

[22] Filed: Sep. 1, 1977

[51] Int. Cl.² .............................................. B60K 17/28
[52] U.S. Cl. ..................... 180/53 D; 60/448;
   60/449; 60/395; 74/11; 185/77 R
[58] Field of Search .................... 180/53, 77 R, 105 E,
   180/109; 60/448, 449, 395, DIG. 2; 74/11, 15.4,
   15.6, 15.63, 15.66, 15.69

[56] References Cited

U.S. PATENT DOCUMENTS

| | | | |
|---|---|---|---|
| 2,599,814 | 6/1952 | Cull | 74/687 |
| 2,939,285 | 6/1960 | Hawkins | 60/395 |
| 3,122,025 | 2/1964 | Mark | 74/11 |
| 3,131,580 | 5/1964 | Forster | 74/15.6 X |
| 3,365,886 | 1/1968 | Moon | 60/448 |
| 3,438,201 | 4/1969 | Nash | 60/52 |
| 3,478,513 | 11/1969 | Ma | 60/395 |
| 3,523,419 | 8/1970 | Hindle | 60/448 |
| 3,529,422 | 9/1920 | Herndon | 60/53 |
| 3,628,330 | 12/1971 | Miller | 60/53 |
| 3,901,031 | 8/1975 | Knapp | 60/395 |
| 3,914,938 | 10/1975 | Cornell | 60/395 |
| 3,924,410 | 12/1975 | Cornell | 60/403 |

OTHER PUBLICATIONS

*Proceedings of the National Conference on Fluid Power,* Oct. 26, 1976.
*Control Engineers' Handbook,* John G. Truxal, Editor, 1st Edition, McGraw-Hill, 1958, pp. 15-56 to 15-61.
Chal-Flo, Challenge-Cook Bros Brochure, Bulletin No. CFD-s-176.

Instructions, Forward Spee Control, W883A, Honeywell Form 95-8138-1, 8/1972.
Moog Snap Trac Servo Electronics Data Sheet, No. 1201-174.

*Primary Examiner*—John P. Silverstrim
*Attorney, Agent, or Firm*—Kinney, Lange, Braddock, Westman and Fairbairn

[57] ABSTRACT

A tractor having a hydraulically driven power takeoff shaft in which manipulation of a control handle in the forward direction causes the speed of the shaft to be varied in accordance with the position of the handle and also in accordance with engine speed. When, however, the control handle is moved to the extreme forward position, the power takeoff shaft is operated at either of two selected constant speeds regardless of engine speed as long as the engine speed is adequate to maintain such constant speed. When the control handle is moved in the opposite direction towards reverse position, the power takeoff shaft is driven at a variable speed, dependent on the position of the handle and on the engine speed. This speed is relatively low as compared with that of the forward speeds.

The tractor is provided with a manually operated energy shutoff control adjacent the power takeoff shaft, in the form of a push button switch which can be actuated whenever a sudden termination of the shaft operation is desired. There are also other switches for terminating operation of the shaft including the engine ignition switch, a temperature responsive switch, an excess load switch, and a low pump pressure switch. There are various indicators on the control panel in the driver's compartment of the tractor to indicate different conditions that exist such as which of the two maximum constant speeds have been selected, and so forth.

16 Claims, 4 Drawing Figures

CONTROL FOR TRACTOR POWER TAKEOFF SHAFT

BACKGROUND OF THE INVENTION

It is quite customary in connection with tractors to have a power takeoff shaft which is driven by the engine and serves as a convenient source of power for driving various accessories. Primarily, such power takeoff shafts are coupled directly or indirectly to the engine of the tractor and the speed at which the shaft is operated is dependent upon the speed at which the engine is operated. Often, however, it is desirable to maintain a constant speed of the takeoff shaft regardless of the speed of the engine. Furthermore, this speed may be any one of two speeds. The Society of Automotive Engineers requires a nominal speed setting for a power takeoff shaft of either 540 or 1,000 rpm.

One of the problems in connection with power takeoff shafts driven by an engine is that it is occasionally very necessary to interrupt quickly the operation of the power takeoff shaft when a potentially dangerous situation arises. Often, the operator is at the rear of the tractor adjacent the power takeoff shaft and has no way of quickly shutting off the engine of the tractor. Various other conditions can arise which make it advisable to terminate quickly the operation of the power takeoff shaft.

SUMMARY OF THE INVENTION

The present invention is concerned with a tractor having a power takeoff shaft in which there is a motor operatively connected to the engine and driven by it, the motor being connected to the power takeoff shaft for driving the same, and in which there is a manually adjustable control for the motor which, upon being moved from a neutral position, is effective to cause the motor to drive the power takeoff shaft at a speed dependent upon the position of the manually adjustable control and the speed of the engine but which, when the manually adjustable control is moved to an extreme position causes the motor to operate the shaft at a predetermined speed regardless of the speed of the engine, as long as the engine speed is adequate to maintain such predetermined speed.

The improved apparatus further provides speed responsive means responsive to the speed of the power takeoff shaft, which speed responsive means is placed in control of the motor for driving the power takeoff shaft when the manually adjustable control is moved to its extreme end position.

The motor is preferably a hydraulic motor which is operatively connected to the engine through a hydraulic pump driven by the engine and which supplies hydraulic fluid to the hydraulic motor. The pump may be a variable displacement pump having a swash plate which is variably positioned to vary the output of the pump and hence the speed of the motor.

The apparatus further provides for a manually positioned control adjacent the power takeoff shaft for causing the motor control means to interrupt operation of the motor driving the power takeoff shaft when the manually positionable control is actuated. In this way, it is possible for an operator adjacent the power takeoff shaft to interrupt quickly the operation of the shaft when necessary. The means for controlling the shaft motor may include electrical circuitry and the manually positionable control for terminating the operation of the power takeoff shaft may be a manually operable switch.

The apparatus further contemplates a device responsive to the pressure of the fluid supplied to the hydraulic motor and means controlled by this pressure responsive device for causing the motor control means to terminate the supply of hydraulic fluid to the motor by the pump whenever the pressure of such fluid indicates an excessive value indicative of an excessive load on the motor.

The apparatus also may employ means responsive to the temperature of the fluid for causing the motor control means to terminate the supply of hydraulic fluid to the power takeoff shaft motor by the pump whenever the temperature of the fluid exceeds a predetermined value.

The apparatus also incorporates a low pump pressure switch responsive to the pressure of fluid supplied to the pump and which stops operation of the engine and pump in the event that pressure of this fluid is at too low a pressure for satisfactory operation of the pump.

The apparatus is preferably so arranged that whenever the operation of the power takeoff shaft motor is terminated for any of various reasons, operation cannot be resumed until the manually adjustable control has been returned to neutral position.

The apparatus also provides for selecting either of two maximum speeds so that when the manual control is moved to one end of its range, the motor operates the shaft at either of two selected maximum speeds regardless of the speed of the engine, as long as the engine speed is adequate to maintain such maximum speed.

It is also contemplated that when the manually adjustable control is moved in a reverse direction, the hydraulic motor will be effective to drive the power takeoff shaft in a direction opposite to that in which it is driven when the manually adjustable control is in the forward range of positions. Preferably, this speed when the motor is operating in reverse direction, is a variable speed dependent upon the position of the manual control and engine speed.

The apparatus also contemplates an indicator in the operator's compartment and controlled by the speed responsive means for indicating the speed of the power takeoff shaft. The apparatus also provides various other indicators in the operator's compartment such as an indicator to indicate when the supply of fluid by the pump has been terminated because of the pressure of such fluid exceeding a predetermined value, and one to indicate low fluid pressure to the pump. Another indicator indicates in the operator's compartment which maximum speed has been selected.

Various other features and objects of the present invention will be apparent from a consideration of the accompanying specification, claims and drawing.

DESCRIPTION OF THE PREFERRED EMBODIMENT

Figure 1:
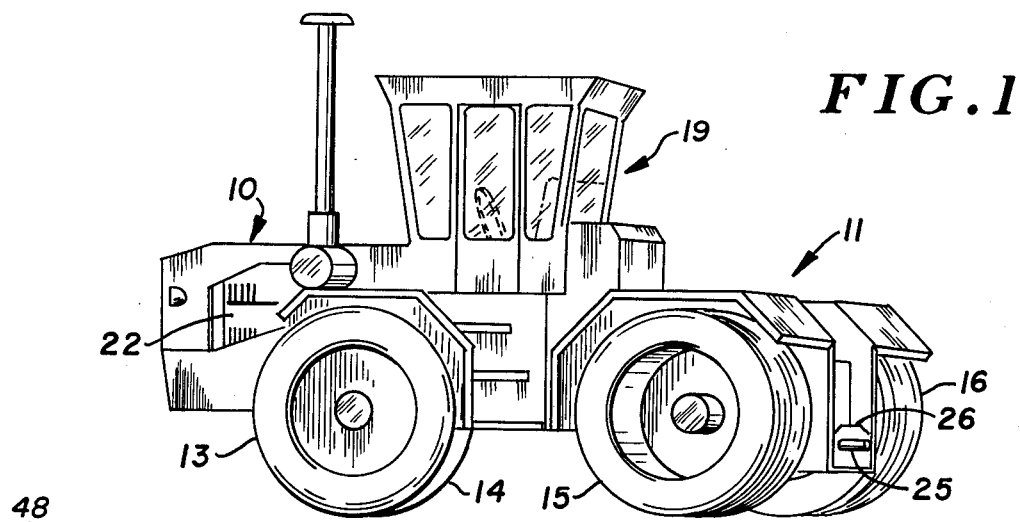
FIG. 1 is a view of a tractor having a power takeoff shaft of the type of the present invention.

Referring to FIG. 1, I have shown the takeoff shaft of the present invention in connection with an articulated tractor of the type having a front section 10 and a rear section 11. These two sections are preferably connected together through a pivotal connection which permits relative movement of the two sections about both a vertical axis and a horizontal axis. Turning is effected by the use of two hydraulic cylinders on each side of the longitudinal center axis, one of which is extended and the other contracted when turning is desired. Vehicles of this general type are shown in the Steiger et al U.S. Pat. No. 3,270,829 and the Irwin U.S. Pat. No. 3,933,216. The front section 10 is supported by two ground engaging driving devices such as wheels 13 and 14 mounted on an axle, not specifically shown, which is rigidly secured to the frame of the vehicle. The back section 11 is similarly supported by two ground engaging driving members such as wheels 15 and 16 mounted upon an axle (not shown) rigidly secured to the frame of the back section. The front section 10 has a body portion on which is supported an enclosed operator's cab 19. The cab 19 is supported on the frame of the vehicle in a conventional manner. Also supported on the frame is an internal combustion engine 22. The engine, as far as the present invention is concerned, may be any suitable internal combustion engine such as a diesel engine.

Referring back to the cab 19, the cab encloses the normal operating controls and a seat for the driver. The present invention is purely concerned with the controls for the engine 22 and the power takeoff shaft, as will be discussed later.

Figure 2:
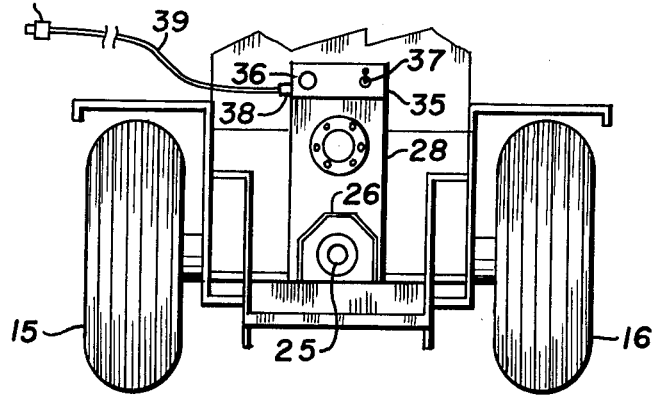
FIG. 2 is a rear view of the tractor of FIG. 1 showing the power takeoff shaft and those controls for the power takeoff shaft which are located adjacent the shaft.
Figure 3:
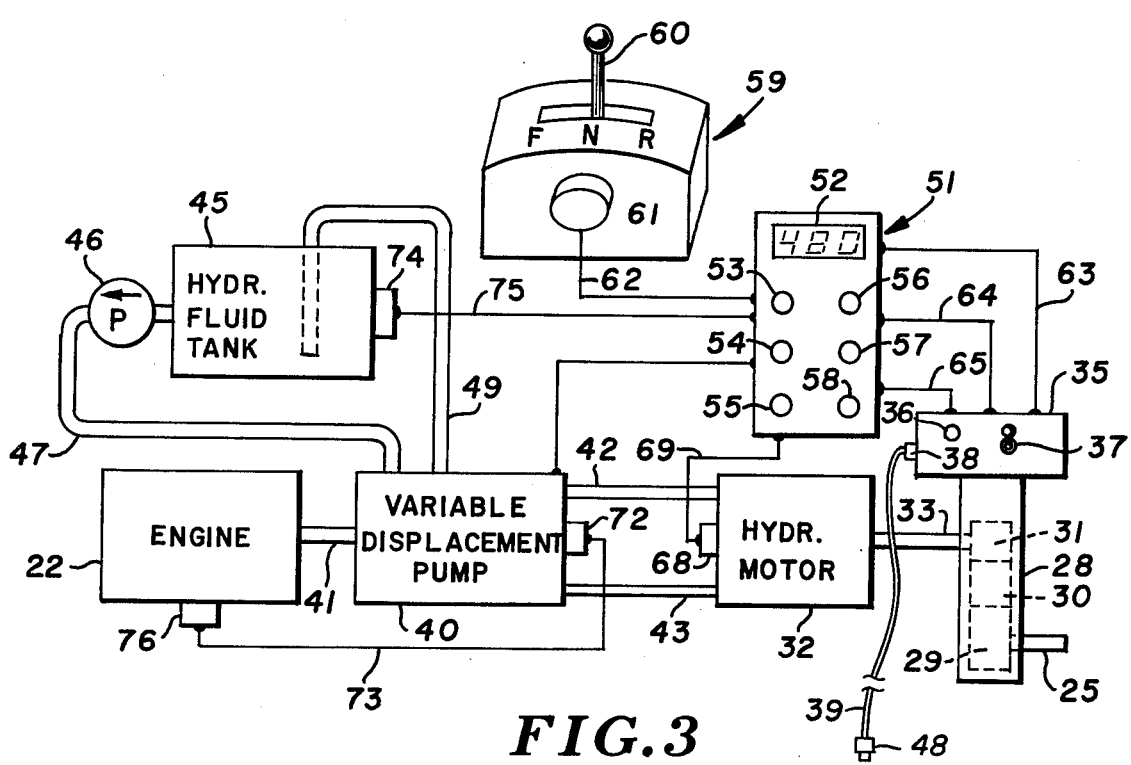
FIG. 3 is a schematic view of the improved control system for the power takeoff shaft.
Figure 4:
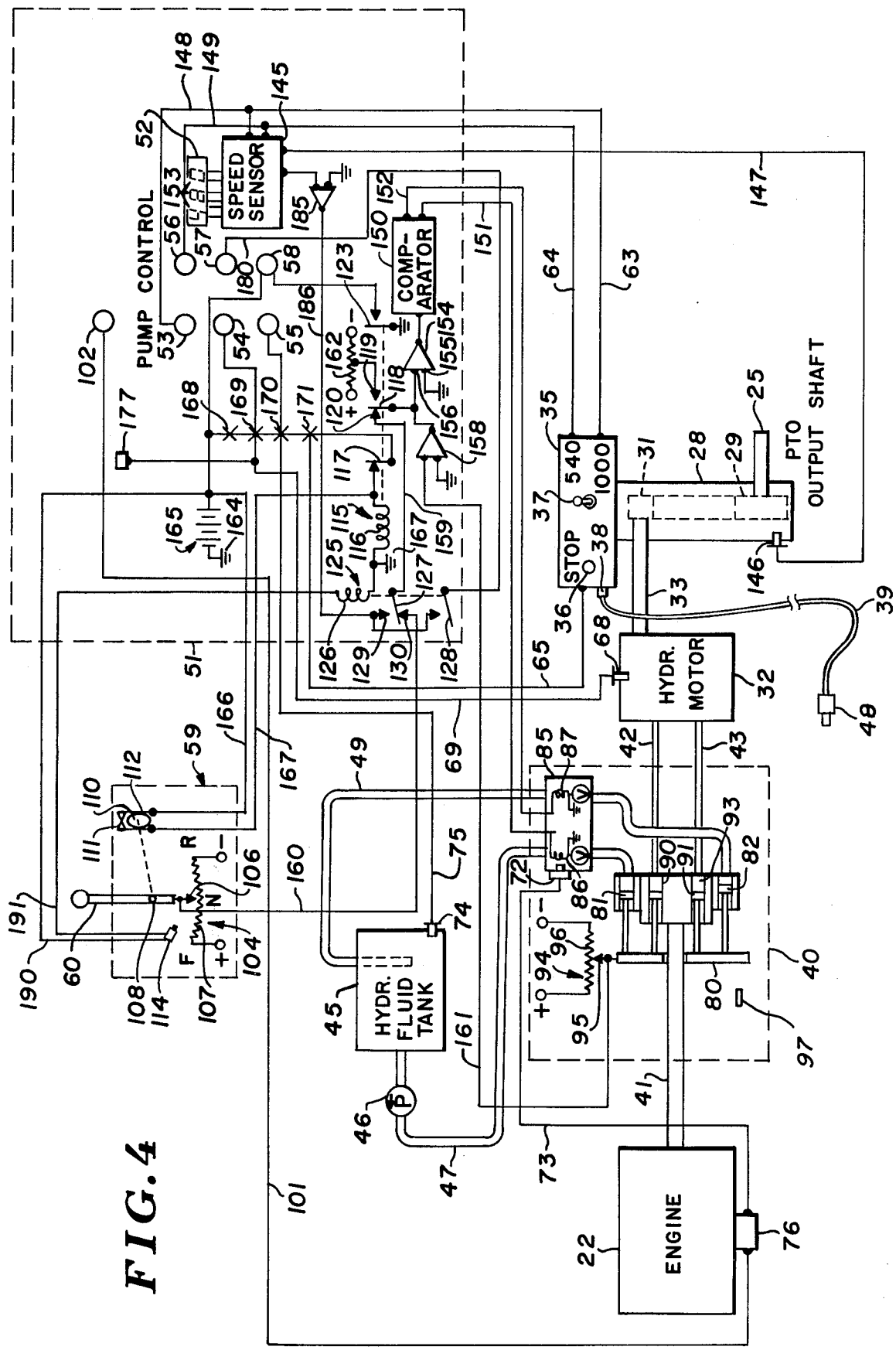
FIG. 4 is a schematic view showing the takeoff control system in more detail.

The power takeoff shaft (often referred to hereinafter as the PTO) is indicated by the reference numeral 25. Surrounding this takeoff shaft is a guard 26 to minimize the possibility of a person coming in contact with the power takeoff shaft 25. The power takeoff shaft, it will be understood, is provided with any suitable means for coupling the same to the device to be driven by the shaft 25. The power takeoff shaft, as best shown in FIGS. 2, 3 and 4, projects out of a drop box 28 and includes suitable means for reducing the speed of the takeoff shaft with respect to the motor driving the same. It also serves to lower the takeoff shaft 25 to the position required by the standards of the American Society of Automotive Engineers. The shaft should preferably be located approximately six to twelve inches above the drawbar and the drawbar should preferably be located approximately fifteen to nineteen inches above the ground. The drop box 28 may take any of various forms for suitably reducing the speed of the power takeoff shaft 25. As shown in dotted lines in FIG. 3, the power takeoff shaft 25 may be driven by a pulley 29 which has a belt 30 extending thereover and connected to a pulley 31 which is driven by a hydraulic motor 32 through a shaft 33. It will be appreciated that while a pulley driven speed reduction mechanism has been shown, other speed reduction mechanisms could be employed.

A control box 35 is shown as being located above the drop box 28 and secured thereon. It is to be understood, however, that this control box may be located in any suitable location convenient to the operator. Projecting from the rear of this control box so as to be accessible to one at the rear of the tractor adjacent the takeoff shaft 25 are a stop button 36 and a maximum speed selector 37. The stop button 36 takes the form of a push button operated switch which, as will be subsequently described, is effective when actuated to stop operation of the hydraulic motor 32. The speed selector 37 may take the form of a toggle switch which has either of two positions. In the position shown in FIG. 3, it is in the position in which the nominal speed of the takeoff shaft is 1,000 rpm. When this speed selector switch 37 is moved to its lower position, the nominal speed of the power takeoff shaft is 540 rpm. The control box 35 may also have a receptacle 38 into which a cable 39 may be plugged. Cable 39 is a two-conductor cable connected at its outer end to a switch 48 which also serves as a top switch and which permits stopping from a remote point the operation of the takeoff shaft 25.

As above noted, the hydraulic motor 32 is employed to drive the pulley 31 which in turn is connected through belt 30 and pulley 29 to the power takeoff shaft 25 (hereinafter referred to as a PTO). As best shown in FIG. 3, the operation of the hydraulic motor 32 is controlled by a variable displacement pump 40 driven by the engine 22. While the variable displacement pump 40 is shown as being connected to the engine 22 through a shaft 41, it will be appreciated that the pump may be driven in any of various manners. For example, the pump may be driven by the engine through a belt connected with the pulley on the end of the crank shaft which pulley also drives various other equipment such as the fan, the power steering pump, an air conditioner compressor, and so forth. The variable displacement pump 40 is effective to supply hydraulic fluid to the motor 32 through a plurality of conduits 42 and 43. The fluid pumped by the pump 40 is supplied from a hydraulic fluid tank 45 through a charge pump 46 and a conduit 47 leading to the variable displacement pump. A return conduit 49 extends from the pump back to the tank 45.

The operation of the pump is controlled by a pump control 51 preferably located within the driver's compartment 19 of the tractor. The pump control 51 has various indicators associated therewith. The indicator 52 is an indicator for indicating the speed. As will be explained, indicator 52 has various light light emitting diodes associated therewith which are selectively energized to display various numerals which collectively indicate the speed of the power takeoff shaft. Also associated with the pump control 51 are lights 53, 54, 55, 56, 57 and 58 which are selectively illuminated to indicate various conditions. For example, when light 53 is illuminated, the takeoff shaft is being operated at the higher of the two fixed speeds, for example, 1,000 rpm. When the light 56 is illuminated, the takeoff shaft is being operated at the lower of the fixed speeds, for example, 540 rpm. When the light 54 is illuminated, it will indicate that the motor is being operated at its rated power. When light 55 is illuminated, it will indicate that the temperature of the hydraulic fluid is excessively high. When light 57 is illuminated, it will indicate that the speed responsive control is in control of the power takeoff shaft. When light 58 is illuminated, it will be necessary for the system to be reset to again be placed in operation. The operation of these various indicators will be discussed in more detail later, particularly in connection with FIG. 4.

The operation of the pump control 51 is controlled by various devices. The primary control is from a control box 59 which has a handle 60 movable between an intermediate neutral position designated N in the drawing either to a fast position designated F or rearwardly to a reverse position designated R. As will be explained, as lever 60 is moved forwardly towards the F position, the speed of the hydraulic motor 32 is increased by increasing the output of pump 40. While the lever 60 is moving between the intermediate position and the high speed position F, a predetermined ratio is maintained between the speed of the engine 22 and the speed at which the hydraulic motor 32 drives the PTO 25, this ratio varying with the position of lever 60. When, however, the handle 60 reaches the end position F, a speed governor is effective to maintain the output shaft 25 at a predetermined speed regardless of the speed of the engine, as long as the engine speed is adequate to maintain this predetermined speed. This speed may be either of two speeds, depending upon the position of the speed selector 37 of the control box 35, previously referred to. The equipment is designed so that the pump 40 will not be placed into operation until the handle 60 is in the neutral position labelled N. If for any reason the handle is in some other position and the pump has been stopped for any reason, it is necessary for the handle 60 to be returned to the neutral position again. The controls positioned by lever 60 are in part positioned in a box 61 which is connected through suitable conductors collectively shown in FIG. 3, for purposes of simplicity, as a single conductor 62, to the pump control 51. The control box 35 also has various conductors extending from it to the pump control 51. For example, there are two conductors 63 and 64 which are connected to the selector switch 37 and which extend between the control box 35 and the pump control 51 to determine whether the speed governor maintains the output shaft PTO at the 540 rpm speed or the 1,000 rpm speed. Similarly, a conductor 65 extends between the stop switch 36 and the pump control 51. It is to be understood that in the case of conductors 63, 64 and 65, there may be more than one conductor, only one being shown in FIG. 3 for purposes of simplicity. A pressure responsive device 68 is associated with hydraulic motor 32 and is connected through a suitable electrical conductor or conductors 69 to the pump control 51. The effect of this connection is to stop operation of the pump when the pressure in the motor rises above a predetermined value indicating an excessive load on the PTO 25. The pump 40 is provided with a pressure responsive device 72 which is connected through a conductor 73 to an engine control 76 which serves to stop operation of the engine, and hence the pump, in the event that the fluid supplied to the pump is at too low a pressure for satisfactory operation of the pump. There is also a temperature responsive device 74 associated with the hydraulic fluid tank 45, this temperature responsive device 74 being connected through a conductor 75 to the pump control to stop operation of the pump if the temperature of the fluid in the tank rises excessively.

From the above, the general operation of the hydraulic power takeoff will be apparent. As the lever 60 is moved towards the F position, it is effective to cause the pump control 51 to vary the output of the variable displacement pump 40 to drive the PTO 25 at a speed dependent upon the speed of engine 22, and upon the position of lever 60. When the lever 60 is moved completely to the F position, the speed of the PTO 25 will be either 1000 rpm or 540 rpm, regardless of the engine speed as long as the engine speed is adequate to maintain the selected PTO speed. Thereafter, the PTO speed will remain at the predetermined value under the control of a speed responsive governor as long as the engine speed does not drop to a value at which the selected PTO speed cannot be maintained. If the operator at any time needs to shut down the system in a hurry, all that it is necessary to do is to push either button 36 on the control box 35 or button 48 at the end of the remote control cable 39 and this will cause the pump control 51 to immediately move the control of the pump 40 to a neutral position at which the pump is not operating. At this point, it should be mentioned that the variable displacement pump 40 may preferably be of the hydrostatic type in which the output of the pump is dependent upon the angle of the "swash plate." When the button 36 is thus actuated, the swash plate is moved to a neutral position at which no pumping action takes place. Similarly, if the load on the hydraulic motor 32 results in an excessive pressure being sensed by the pressure sensor 68, the pump will again be placed in a position at which it does not pump. Again, if the temperature of the hydraulic fluid as sensed by the temperature sensor 74, rises above a predetermined value, the swash plate in the pump will be moved to a neutral position to cease pumping operation. If the pressure in the pump falls below a predetermined value at which proper operation of the pump is impossible, the pressure sensor 72 will be effective to cause operation of the engine and pump to stop. It will thus be seen that I have provided a control system in which by the manipulation of a lever, the operator may either have obtained a predetermined relationship between the speed of the PTO and that of the engine or, by moving the lever to an end position, it is possible for the PTO to be operated at a constant speed at either of two selected values regardless of the speed of the engine so long as the engine speed is adequate. In any of various emergency conditions, the pump will promptly shut down to terminate operation of the PTO.

In the foregoing description, no mention has been made of the movement of lever 60 in the opposite direction towards the reverse position R. When the lever 60 is moved in the opposite direction, the PTO is operated in the opposite direction at a relatively low speed. Normally, under these conditions, a high speed is not desirable and it is desirable that the speed be variable and relatively low, depending on lever position and engine speed.

In the foregoing description, the broad operation has been described with reference to various controls. In FIG. 4, these controls are shown in more detail. In considering FIG. 4, similar reference characters have been applied where possible to the elements corresponding to those in FIGS. 1 to 3. Unless otherwise indicated, the elements which have been broadly described in connection with FIG. 3 will not be again referred to except in connection with the overall operation unless they are shown in more detail in FIG. 4. Among the units which are shown in more detail in FIG. 4 is the variable displacement pump 40. This pump can take a variety of forms, but, as indicated above, it may well be a hydrostatic pump employing a swash plate, the angular position of which is adjusted to vary the output of the pump. A typical pump of this type is shown in the Knapp et al U.S. Pat. No. 3,901,031 and reference may be made to that patent for the construction of the pump and certain aspects of the control thereof. The pump is shown schematically, however, in FIG. 4. Referring to FIG. 4, a swash plate 80 of conventional type is mounted for angular positioning with respect to the shaft 41. In this neutral position, the swash plate is disposed at an angle of 90° with respect to the axis of the shaft 41. The swash plate 80 is mounted for tilting with respect to this vertical position and the angular position of swash plate 80 is controlled by two control cylinders 81 and 82, each of which has a piston connected to the swash plate. Customarily, the swash plate 80 and the block in which cylinders 81 and 82 are disposed is stationery and does not rotate with shaft 41. When fluid is admitted to control cylinder 81, the swash plate 80 is tipped in a counter clockwise direction. When, on the other hand, fluid is admitted to control cylinder 82 and allowed to leave control cylinder 81, swash plate 80 is moved in a clockwise direction. The flow of fluid into and out of the cylinders 81 and 82 is controlled by a valve mechaism 85 having therein two solenoid valves 86 and 87 which are selectively energized depending upon the degree and direction of movement desired for hydraulic motor 32. Solenoid valve 86 controls the flow of fluid to hydraulic cylinder 81 while solenoid valve 87 controls the flow of fluid to hydraulic cylinder 82. Fluid is supplied to the cylinders from the fluid tank 45 through the charge pump 46 and conduit 47. The fluid leaving one or the other cylinders flows through pipe 49 and back to the pump 45. It will be appreciated that the valves 86 and 87 are more involved than shown. A typical valve construction is shown in the aforesaid Knapp et al U.S. Pat. No. 3,901,031. The valve construction has been simplified, however, for purposes of illustration in the drawing.

The swash plate 80 controls the operation of two pumps 90 and 91 which are located in a block 93 which may be driven by the shaft 41. Each of these pumps has therein a piston which has a stem, the outer end of which is in sliding engagement with the swash plate 80. It will be readily apparent that if the swash plate 80 is tilted, and the block 93 containing the pumps 90 and 91 is rotated, the pistons of the pumps will be alternately moved back and forth to produce a pumping action. The operation of the pistons of the two pumps will be 180° out of phase. The pump 90 is connected through a suitable sliding connection to the conduit 43. The hydraulic motor 32 to which conduits 42 and 43 lead, may be a hydrostatic motor employing a swash plate connected to the output shaft 33. The direction and speed of hydraulic motor 32 will depend upon the direction in which the swash plate 80 of pump 49 is tilted and the extent to which it is tilted. This action is well known and need not be described in more detail here.

The swash plate 80 is also operatively connected to the slider of a follow-up potentiometer 94 having a slider 95 movable over a resistor 96 in sliding engagement therewith. One end of the resistor 96 is connected to a positive terminal of a source of voltage and the other to the negative terminal of the source of voltage. As will be subsequently described, the follow-up potentiometer 94 supplies a follow-up signal to terminate movement of the swash plate 80 by the control cylinders 81 and 82 when the swash plate is in a position corresponding to the position of the control handle 60 or, when the hydraulic motor 40 is under the control of the speed responsive mechanism, when the desired speed is being maintained.

A stop 97 is positioned adjacent the lower end of swash plate 80 to limit the movement of the swash plate in a clockwise direction. The purpose of this is to reduce the speed of the PTO shaft in the reverse direction. As will be explained later, the swash plate is tilted in a clockwise direction when it is desired to have the PTO shaft operate in the reverse direction. By placing the stop 97 adjacent the lower end of swash plate 80, the speed of the PTO shaft for any given engine speed is relatively low as compared with that when the PTO shaft is operated in the forward direction. In a typical case, a maximum reverse speed of 130 rpm is employed.

In FIG. 4, the low pressure switch 72 is again shown. It will be noted that it is shown in connection with the valve mechanism 85 so as to be subject to the pressure of the fluid supplied by charge pump 46 through conduit 47. This low pressure fluid sensor is connected through the conductor 73 to the engine control 76 which may be in the form of a magnetic shutdown switch. This switch is designed, when operated, to shut off the supply of fuel to the engine to stop the operation thereof. The magnetic switch is also connected through a conductor 101 to a low pressure warning light 102 which is located in the cab and may form part of the pump control 51. If desired, the switch 76 may be designed so as to actuate the low pressure warning light prior to shutting down the engine so that the operator is alerted that the pressure within the pump is unduly low.

Referring now to the control box 59, this, as previously explained, is provided with a pivoted lever 60 which extends through a slot in the control box and is movable between a central neutral position towards a fast position or in the opposite direction towards the reverse position. As shown in FIG. 4, this potentiometer 104 comprises a slider 106 movable over a resistor 107, the opposite ends of which are connected to the positive and negative terminals of the same power supply as that to which the resistor 96 of follow-up potentiometer 94 is connected. The lever 60 is pivoted about a point 108 and is operatively connected to a cam 110 which is associated with two switch blades 111 and 112 which are biased into engagement with each other. When the lever 60 is in the neutral position shown in the drawing, the cam 110 is in such a position that the switch blades 110 and 111 are in engagement with each other by reason of their normal bias. When, however, the lever 60 is moved away from neutral position, the cam 110 is rotated in such a manner as to separate switch blades 111 and 112. As will be presently explained, the switch blades 111 and 112 are in the energizing circuit of a relay which must be closed when the PTO shaft is operating. After the relay is energized, it can be maintained energized independently of switch blades 110 and 111. Once, however, that the system has been shut down by reason of any of various conditions to be described later, it is necessary to return the lever 60 to the neutral position shown in order to reclose switch blades 110 and 111 to reenergize the relay. This operation will be described in more detail later.

The switch blades 110 and 111 control the energization of a relay 115. This relay comprises a relay coil and switch blades 117, 118, and 123. The relay is shown in energized position in which position switch blade 117 is in engagement with its associated contact and switch blade 118 is in engagement with an "in" contact 120. When the relay coil 116 is deenergized, switch blades 117 and 118 are moved to the right by reason of a suitable biasing means and switch blade 117 separates from its associated contact, switch blade 118 moves out of engagement with the "in" contact 120 and into engagement with an "out" contact 119, and switch blade 123 moves into engagement with an "out" contact. The relay 115, as will be described later, is employed to move the swash plate 80 to the neutral position whenever various conditions exist.

Also associated with the control lever 60 is a switch 114 which is closed whenever the lever is moved to the extreme "fast" position; that is, when the slider 106 is adjacent the left hand end of potentiometer resistor 107. The switch 114 may take any suitable form, such as that of a precision snap switch having an actuator button which is engaged when the lever 60 is moved to the extreme fast position. The switch 114 in turn controls the energization of a second relay 125. The relay 125 comprises a relay coil 126 and a plurality of switch blades 127 and 128 operatively connected to the relay coil. The relay 125 is shown in the deenergized position, in which position switch blade 127 is in engagement with an "out" contact 130 and switch blade 128 is separated from its associated contact. When relay coil 126 is energized, switch blades 127 and 128 are moved upwardly, switch blade 127 moving into engagement with an "in" contact 129 and switch blade 128 moving into engagement with its associated contact. The relay 125 is employed, as will be explained later, to transfer the control of solenoid valves 86 and 87 from potentiometer 104 to the speed sensor whenever the lever 60 is moved to the full fast position or in the reverse direction. This also controls an indicator to indicate that the system is under the control of the speed governor.

As previously explained, when the lever 60 is moved from a neutral towards a reverse position, the speed of the PTO shaft 25 varies with engine speed and initially with the position of lever 60. Due, however, to the movement of the swash plate 80 being limited by the stop 97, the speed of the PTO shaft relative to the engine speed can only be varied through a limited range and tends to be relatively low as compared with that when the PTO shaft is driven in a forward direction. When the engine reaches its maximum speed with swash plate 80 in engagement with stop 97, the speed of the PTO shaft will then be relatively constant, being dictated by the maximum speed of the engine. In a typical case, the maximum reverse speed is 130 rpm, as previously noted. Because the reverse speed of the PTO shaft 25 normally varies with the engine speed, the shaft is not under control of the speed sensor 145 at any time. Hence, no switch equivalent to switch 114 is provided in connection with the reverse movement of lever 60.

Turning now to the pump control 51, certain portions of this have already been referred to, namely, the relays 115 and 125. Reference has also been made to the indicator lights 53, 54, 55, 56, 57 and 58, as well as to the digital speed indicator 52.

The pump control 51 contains much of the circuit components for controlling the operation of the hydraulic motor in response to the control lever 60 and the speed responsive device and various auxiliary controls. An important component of this pump control is a speed sensing device 145. This speed sensing device has an input controlled by a magnetic speed pickup 146 associated with the drop box 28. This speed pickup consists of a suitable magnetic sensor designed to supply an impulse for each rotation of the output shaft 25. Such magnetic speed sensors are common. For example, it may consist of a magnetic coil adjacent which passes a notched portion of the pulley 29. The magnetic speed sensor 146 is connected by an electrical cable 147 to the speed sensor. The speed sensor is capable of supplying digital signals to the various light emitting diodes 153 to selectively energize various portions thereof to display different numerals. The right-hand numeral may be a constant zero and be illuminated whenever the apparatus is in operation. The speed sensor is also provided with a suitable digital to analog converter of conventional form to provide an analog signal which, as will be explained later, is employed to control the operation of the solenoid valves 86 and 87 to maintain a suitable selected speed. The selector switch 137 is connected through conductors 63 and 64 to the speed sensor 145 so that the output thereof depends upon the position of speed selector 37. If speed selector 37 is in the uppermost position, a signal is sent through conductor 64 to the speed sensor to cause the speed sensor to maintain an output such as to maintain the speed of output shaft 25 at 540 rpm, for example. Similarly, when the switch 37 is moved to its lower position into the 1,000 rpm position, a signal is sent through conductor 63 to the speed sensor to cause the speed sensor to maintain the output shaft 25 at a speed of 1,000 rpm., for example.

The speed selector switch 37 is also employed to control the energization of the two indicating lamps 53 and 56. It will be noted that conductor 63 is connected through a conductor 148 to the indicating lamp 53 which indicates that 1,000 rpm is being maintained. Similarly, conductor 64 is connected through a conductor 149 to the indicator lamp 56 to indicate that a 540 rpm speed is being maintained. It is of course understood that suitable energizing means are associated with these circuits for energizing the respective indicators 53 and 56 when the switch is in one of the other positions. This energizing means has been omitted for purposes of simplifying the disclosure, however.

Also included in the pump control 51 is a comparator and amplifier 150. This amplifier has two output circuits 151 and 152 which are selectively connected to solenoid valves 86 and 87, respectively. The comparator 150 is designed to have an input thereto dependent upon the relative values of the signal from the follow-up potentiometer 94 and the control potentiometer 104 or the speed sensor 145 and to compare this with a fixed signal to supply an output to either conductor 151 or 152, depending upon the relative values of the input signal with respect to the fixed signal. Such comparators are old and well known and need not be described in detail.

The input to comparator 150 is controlled by an amplifier 154 having a grounded input terminal 155 and an ungrounded input terminal 156 which is connected to the output of an inverting amplifier 158, the input of which is connected through a conductor 161 to the slider 95 of the follow-up potentiometer 94. The input terminal 156 of amplifier 154 is also connected to the relay switch blade 118. When relay switch blade 118 is in engagement with contact 120 as is the case when relay 115 is energized, switch blade 118 and hence input terminal 156 is connected through switch blade 118, contact 120, a conductor 159, switch blade 127, contact 130 and conductor 160 to the slider 106 of potentiometer 104. Under these conditions, the input from the potentiometer 104 is supplied to the comparator 150, along with the input from the follow-up potentiometer 94. When relay 115 is deenergized so that switch blade 118 is in engagement with contact 119, the switch blade 118, and hence input terminal 156, is connected through contact 119 to the center tap of a potentiometer 162 connected across the same source of power as are resistors 107 of potentiometer 104 and resistor 96 of follow-up potentiometer 94. In this case, a voltage is supplied from the potentiometer 162 which corresponds to the voltage of the midpoint of resistor 107 of the main control potentiometer 104. When the slider 106 is in this position, the follow-up system is balanced only when the swash plate 80 is in the neutral position shown in FIG. 4. In this position, no fluid is supplied to the hydraulic motor 32 and the output shaft is not driven. Thus, whenever the relay 115 is deenergized, a voltage is supplied by the potentiometer 162 to the amplifier 154 such that the swash plate is driven to the neutral position. It is only in this position that the voltage of the slider 96 corresponds to the voltage supplied by the potentiometer 162.

Referring now to the energization of relay 115, which controls the switch blade 118 in the manner just described, the relay coil 116 is connected through certain switches to a battery 165, the negative terminal of which is grounded at 164. When the switch blades 110 and 111 of the control box 59 are closed due to the lever 60 being in its neutral position, an energizing circuit is established to the relay coil 115 as follows: from the positive terminal of battery 165 through a conductor 166, switch blades 112 and 111, conductor 167, relay coil 116, and through the ground connections 167 and 164 back to the battery 165. The energization of relay coil 116 causes switch blades 117 and 118 to move to the position shown. In this position, a holding circuit for relay coil 116 is established independently of switch blades 110 and 111. This holding circuit may be traced from the positive terminal of battery 165, through switches 168, 169, 170 and 171, switch blade 117 and its associated contact, relay coil 116 and the ground connections back to the battery 165. It will be noted that this new circuit does not depend upon continued closure of switch blades 110 and 111. It is thus possible, once relay coil 116 has been initially energized, to move the lever 60 to other positions than that shown in the drawing in which position switch blades 110 and 111 are in contact with each other.

The switch 168 is the ignition switch of the engine of the tractor so that the ignition switch must be closed for this circuit to be established. Once the ignition switch is opened, relay 115 is deenergized. Switch 169 is the switch which is operated in accordance with the load on the hydraulic motor. The load sensor 68 previously discussed in connection with FIG. 3 is operatively connected through a suitable conductor 69 or other means to an actuator for the switch 169 to open this switch whenever the load exceeds a desirable value. The load sensor may also be connected to an overload indicator 177 which may turn on slightly before switch 169 is opened to indicate that an overload condition is being approached. This may take the form, for example, of a buzzer which is energized about 6 seconds before switch 169 is opened. The overload device is also operatively connected to the indicator 54 to energize this indicator whenever the switch 160 is open to indicate that the load has been exceeded.

The switch 170 is controlled in accordance with temperature and is operatively connected through the conductor 75 or other suitable means to the temperature sensor 74 associated with the hydraulic fluid tank. Whenever the temperature in this tank exceeds a predetermined maximum desired value, the temperature sensor 74 is effective to open switch 170. Switch 170 also controls the energization of the indicator 55 so that when the temperature exceeds a desired value, this is indicated by temperature indicator 55. The switch 171 is the emergency stop switch which is controlled by stop button 36. Whenever stop button 36 is actuated to quickly shut down the system, the switch 171 is opened.

Whenever any one of the switches 168, 169, 170 or 171 is open, the holding circuit through relay coil 116, previously traced, is interrupted. Since presumably the lever 60 is in some other position than neutral position under these conditions, the energizing circuit through switch blades 111 and 112 is interrupted. Thus, the relay 115 becomes deenergized causing switch blade 117 to separate from its contact and switch blade 118 to move out of engagement with contact 120 and into engagement with contact 119. As previously explained, this results in a voltage being supplied by potentiometer 162 which corresponds to the voltage at the midpoint of potentiometer 104. At the same time, the movement of switch blade 118 out of engagement with contact 120 results in disconnection of the input of the amplifier 154 from the slider 106 of potentiometer 104. This will result in the swash plate 80 being moved to a neutral position. At the same time, a circuit is established to indicator 58 from the positive terminal of battery 165 through conductor 180, indicator 58, switch blade 123 and its associated contact and back through ground to battery 165. This will cause indicator 58 to be energized to indicate that the system has been shut down and that the power takeoff shaft 25 is no longer being rotated due to the swash plate 80 being in its neutral position.

As previously explained, it is desired that once the system has been stopped for any reason, it be impossible to restart it until the lever 60 is moved to the neutral position. As above noted, the deenergization of relay 116 due to any of the switches 168, 169, 170 and 171 opening causes switchblade 117 to move away from its associated contact. It thus becomes impossible to reenergize relay 116 through the circuit including the switches 168 through 169 since the relay switchblade 117 is in series therewith. The only way in which relay coil 116 can be reenergized is through the initial energizing circuit previously traced through switchblades 111 and 112. It is hence necessary to move the control lever 60 back to the neutral position shown in the drawing at which time switchblades 110 and 111 are again reengaged. When this happens, it is again possible to reenergize the relay coil 116 to reenergize relay 115. It is thus assured that if the swash plate is moved to a neutral position as a result of any of the various conditions actuating switches 168, 169, 170 and 171 occurring, the hydraulic motor 32 cannot be again operated until the control lever 60 is moved to neutral position.

Whenever the pressure within the valve chamber 85 falls below a predetermined value at which proper operation of the swash plate mechanism is possible, the pressure sensor 72 is effective to send a signal to the engine shutdown magnetic switch 76 and also through conductor 101 to the low pressure warning light 102. If desired, as previously explained, the magnetic switch may be effective to send a signal to the warning light some time prior to operating the fuel supply shutoff. The magnetic switch is operable when low pressure exists to interrupt the fuel supply to the engine in any suitable manner. For example, the switch may control a solenoid valve in the fuel line to interrupt the energization of the fuel line and stop the supply of fuel to the engine when the pressure becomes excessively low.

The analog output of the speed sensor 145 is applied to the ungrounded input terminal of an amplifier 185. The output of this amplifier 185, which may be of any conventional type, is connected through conductor 186 to the contact 129 associated with switchblade 127. The output of amplifier 185 is an analog output of a magnitude corresponding to the speeds being sensed. The magnitude of the signal supplied by speed sensor 145 to the input of amplifier 185, for any given speed, is determined by the setting of the selector switch 37. This will be described in more detail. In any event, when switchblade 127 is in engagement with contact 129, the output of the amplifier 185 is connected through conductor 186, contact 129, switchblade 127, conductor 159, contact 120 and switchblade 118 to the input terminal 156 of the amplifier 154, the output of which is connected to the comparator 150. Thus, under these conditions, a signal from the speed sensor is substituted for the signal from the control potentiometer 104.

OPERATION

While the general operation of the system should be apparent from the foregoing description, the operation will be briefly reviewed in the following paragraphs. Assuming the various elements to be in the position shown, the control lever 60 being in the neutral position, relay 115 will be energized so that the switchblades 117, 118 and 123 will be in the position shown. Let it also be assumed that the speed selector switch 37 is in the position shown in which it is desired to maintain a speed of 540 RPM. The indicator 56 will be energized by reason of the connection from speed selector switch through conductors 64 and 149.

It is also to be assumed that the engine ignition switch 168 is closed. Since the power takeoff shaft 125 is not operating, there will be no particular load on the hydraulic motor and the load responsive switch 169 will be closed. Likewise, the temperature in the fluid tank is presumably low so that the temperature responsive switch 170 will be closed. Thus, it is possible with the relay coil 116 energized and the switchblade 117 closed to maintain relay 115 energized even if the control lever 60 is moved away from the neutral position shown.

Referring to the operation of the follow-up system, with the control lever 60 in its neutral position, a positive voltage exists on slider 106 since the slider is half way between the lefthand positive end of the resistor and the right hand negative or zero end of the resistor. Under these conditions, a voltage equal to half of the applied voltage is applied through conductor 160, contact 130, switchblade 127, conductor 159, contact 120 and switchblade 118 to the input terminal 156 of amplifier 154. At the same time, an equal voltage is being applied through conductor 161 to the input terminal of inverting amplifier 158, the output of which is also connected to the input terminal 156. The output of inverting amplifier 158, as is conventional, inverts the signal from slider 95 of follow-up potentiometer 94, without amplification thereof, so that the signal applied to the input terminal 156 from the follow-up potentiometer is equal and opposite to that supplied from the slider 106. The result is that a zero signal is applied to the input of amplifier 154 and the signal supplied to the comparator 150 is such that a voltage is applied to neither output conductor 151 or output conductor 152. The result is that solenoid valves 86 and 87 remain closed and the swash plate is maintained in the position shown.

Let it now be assumed that the lever 60 is moved towards the fast position, that is, in such a direction that slider 106 is moved to the left and towards the positive end of the resistor 107. The effect of this is that the positive signal supplied by slider 106 to the input of the amplifier 154 will now be greater than that supplied by the slider 95 through the inverter amplifier 158. The result will be that a positive signal will be applied to the input terminal of amplifier 154 with the result that the output of the amplifier 154 supplied to comparator 150 will increase to cause the voltage to change with respect to the reference voltage. The comparator 150 is effective under these conditions to supply a signal to the conductor 151 to open the solenoid valve 86. Charge pump 46 is now effective to supply pressure through the solenoid valve 86 to the control cylinder 81 forcing the swash plate to turn in a counter-clockwise direction. The fluid in the righthand side of the control cylinder 82 returns to the control valve chamber 85 and from there through the return line 49 to the hydraulic fluid tank. Fluid continues to be supplied to the righthand side of the cylinder 81 rotating the swash plate 80 in a counter clockwise direction. As this happens, the voltage of the slider 95 of the follow-up potentiometer 94 increases so that the signal supplied thereby to the input of inverting amplifier 158 likewise increases. This continues until the slider 95 is in a position such that the voltage supplied thereto is sufficient to cause the inverting amplifier 158 to supply an equal and opposite signal to that supplied by the slider 106 in the new position of the control lever 60. Through these conditions the comparator 150 will cease to supply a signal through conductor 151 to valve 86 and valve 86 will again be reclosed leaving the swash plate 80 in a new position corresponding to the position of the control lever 60. As swash plate 80 is moved in this way from its neutral position shown, the swash plate will alternately operate the pistons of pumping cylinders 90 and 91 as these are revolved. The result will be flow of fluid through the lines 42 and 43 to cause operation of the hydraulic motor 32 which, as previously explained, may be of the swash plate type. It will be obvious that further movement of slider 60 towards the fast position will increase the amount to which swash plate 80 is tilted in a counterclockwise direction, thus further increasing the amount of pumping action of pumps 90 and 91 and the speed of operation of the hydraulic motor 32.

During this range of movement, the speed of the output shaft 33 will be dependent upon the speed of the engine since the swash plate is moved to a fixed position dependent upon the position of control lever 60 and the more the swash plate is moved, the faster the takeoff shaft will operate for a given speed of engine 22. Regardless, however, of the position of swash plate 80, there will tend to be a relatively constant relationship in a given position of swash plate 80 between the power takeoff 33 and the engine 22. As the swash plate is moved to the left, the speed of the power takeoff will increase for a given speed of engine 22 but will still be dependent upon the speed of the engine.

When, however, the lever 60 is moved to the end position in which switch 114 is closed, the speed of PTO shaft 25 will be controlled by the speed sensor 145 to maintain a constant speed, as long as the engine speed is high enough to maintain the speed. The closure of switch 114 causes energization of relay 125 as previously discussed. Upon closure of switch 114, a circuit is established from the positive terminal of battery 165 through conductor 190, switch 114, conductor 191, relay coil 126, and through the ground connections back to the battery 165. When relay 125 is energized, switch blade 127 is moved out of engagement with contact 130 and into engagement with contact 129. At the same time, switch blade 128 is moved into engagement with its in contact. The movement of switch blade 127 into engagement with contact 129, as previously explained, connects the output of amplifier 185, which is connected to the output of the speed sensor, to the input terminal 156 of amplifier 155. At the same time, as also previously explained, the slider 106 of control potentiometer 104 is disconnected from the input to amplifier 155, since slider 106 is connected to the out contact 130. Also, as previously explained, the engagement of relay switch blade 128 with its in contact connects the indicator 57 to the output of amplifier 185 or to a suitable source of power to enable this indicator to indicate that the unit is now under the control of the speed governor. The speed sensor will now proceed to adjust the swash plate 80 to maintain a predetermined speed. The speed that is maintained will be dependent upon the position of speed selector switch 37. If the speed selector switch 37 is in its uppermost position as shown, the speed sensor will operate to maintain a speed for the output shaft of 540 rpm. If, on the other hand, the speed selector 37 is in its lower position, the speed sensor will be effective to maintain an output shaft speed of 1,000 rpm. If the speed is below the desired value when the relay 125 is actuated, the signal sent by the speed sensor will not be balanced by the signal from the followup potentiometer 94. As a result, a signal will be supplied to the comparator such as to cause energization of control valve 86 to move the swash plate further in a counterclockwise direction. This in turn will result in a greater output from the follow-up potentiometer 94. This action will continue until the swash plate is in a new position at which the speed tends to be that which the speed sensor is set to maintain. In order to avoid a sudden change in speed when the speed sensor is placed in control of the swash plate, it is desirable to vary the effect of the follow-up potentiometer 94 whenever the speed selector is changed in position. This may be done by using the switch 37 to vary the gain of amplifier 158 through suitable connections (not shown) between switch 37 and amplifier 158. Thus, when the switch is in the 540 rpm position, the control potentiometer will have greater input to the amplifier 154 for a given movement of the slider 95 so that the swash plate is not moved as far for a given movement of the control potentiometer 104. This will result in a slower speed of PTO shaft 25 for any given position of lever 60. On the other hand, when the switch 37 is in the 1,000 rpm position, the gain of the amplifier 158 will be less so as to cause a greater movement of the swash plate 80 to balance a given signal from the control lever 60. In this way, it is possible to insure that as the control lever 60 approaches the switch 114, the PTO shaft will be already rotating at a speed close to that which will be maintained by the speed sensor when switch 114 is actuated.

When the control lever 60 is moved in the reverse direction towards position R, slider 106 will move towards a more negative position. At the same time, the lever 60 will cause switch blades 110 and 111 to separate through the action of cam 110. This will deenergize relay 115, transferring the control of the input to amplifier 155 from center tapped potentiometer 162 to the slider 106. The effect of this is that the signal supplied by slider 106 to the input of amplifier 154 will now be less positive than that supplied by the slider 95 to the inverter amplifier 158. The result will be that a negative signal will be supplied to the input terminal of amplifier 154 with the result that the output of amplifier 154 supplied to comparator 150 will decrease to cause the voltage to change with respect to the reference voltage. The comparator 150 is effective under these conditions to supply a signal through conductor 152 to open the solenoid valve 87. Charge pump 46 is now effective to supply pressure through the solenoid valve 87 to the control cylinder 82, forcing the swash plate to turn in a clockwise direction. The fluid in the right hand side of the control cylinder 81 returns to the control valve chamber and from there through the fluid line 49 to the hydraulic fluid tank. Fluid continues to be supplied to the right hand side of the cylinder 82, rotating the swash plate in a clockwise direction. As this happens, the voltage of the slider 95 of the follow-up potentiometer 94 decreases in the positive direction so that the signal supplied thereby to the input of inverting amplifier 158 likewise decreases. This continues either until swash plate 80 engages the stop 97 or until the voltage supplied by potentiometer 94 is sufficiently low as to cause the inverting amplifier 158 to supply an equal and opposite signal to that supplied by the slider 106 in the new position of the control lever 60. If the latter is the case, that is, if the swash plate 80 has not yet engaged the stop 97 and the signal from the follow-up potentiometer 94 balances the signal from the control potentiometer 104, the comparator will cease to supply a signal through conductor 152 to valve 87 and valve 87 will again be reclosed, leaving the swash plate in a new position corresponding to the position of the control lever 60. Again, with the swash plate 80 displaced from its neutral position, the swash plate will alternately engage the pistons of pumping cylinders 90 and 91 as these are revolved. Since, however, movement of the pumping cylinders will be 180° displaced in phase from that which occurs when the swash plate is tilted in a counterclockwise direction, as previously described, the hydraulic motor 32 will be operated in a reverse direction to that described when lever 60 is moved in the forward direction.

It is obvious from the foregoing description that as the lever 60 is moved towards the reverse direction, the swash plate will be moved further in a clockwise direction, increasing the speed of the shaft relative to the engine speed. This continues until swash plate 80 engages the stop 97 which is so located as to limit materially the possible movement of swash plate 80. As previously noted, this stop is so selected that with a typical engine operating at its maximum speed, the maximum speed of the takeoff shaft will be only 140 rpm. This is desirable because the reverse operation is normally only a temporary operation for a limited period of time.

From the foregoing description, it will be clear that when the lever 60 is moved in the reverse direction, the speed of the PTO shaft 25 is always proportional to the engine speed. Within the limited range of movement of the shaft 60, the speed of the shaft will vary with respect to a given engine speed. Once, however, the swash plate 80 engages the stop 97, the speed of the PTO shaft 25 with respect to the engine will always be constant. As soon as the engine has reached its maximum speed, the speed of the PTO shaft will thereafter be relatively constant.

If at any time any of the conditions affecting the switches 168, 169, 170 and 171 are such that these switches are open, relay 115 becomes deenergized. For example, actuation of the stop button 36 or of remote stop button 48 to cause actuation of stop switch 171 will break the circuit to relay 115. Similarly, if the temperature of the fluid in tank 45 rises unduly, to cause opening of switch 170, relay 115 will be deenergized. Likewise, an excessive load on the motor as indicated by the load sensor 68 will cause opening of switch 169 and deenergize the relay. Under any of these conditions, the control handle 60 will be in a position other than the neutral position so that the initial energizing circuit through switch blades 111 and 112 will be opened. Thus, the breaking of the holding circuit through switches 168, 169, 170 and 171 will result in complete deenergization of the relay 115. As previously noted, this connects the input of the amplifier to the midpoint of the potentiometer 162 so that the swash plate is automatically moved to a neutral position such as that shown in the drawing. At the same time, the indicator 58 is energized to indicate that the system has been shut down. As previously pointed out, the system cannot again be restarted until the control lever 60 is moved to a neutral position to cause reclosure of switch blades 111 and 112.

As stated previously, if at any time the pressure in the pump falls below a predetermined value at which proper operation of the pump is impossible, the pressure switch 72 will operate through conductor 73 and engine control 76 to stop the operation of the engine. At the same time, the low pressure warning light 102 will be energized through conductor 101.

CONCLUSION

It will be seen that I have provided a control for a hydraulically operated power takeoff shaft in which it is possible through manipulation of a single control to obtain a variety of operations of the takeoff shaft. The speed may be varied in relation to engine speed or either of two fixed maximum speeds may be maintained. When the control lever is moved in the reverse direction, the power takeoff shaft is operated in a reverse direction at a variable, relatively low speed. If any of various emergencies arise, it is possible to quickly shut down the hydraulic motor by causing the pump to terminate its operation.

While I have shown a specific embodiment of my invention for purposes of illustration, it is understood that the scope of the invention is limited solely by that of the appended claims.

I claim:

1. In combination:
   a tractor having means for propelling the same along the ground, an engine for driving said propelling means, an operator's compartment, and means including an operator's control in said operator's compartment for varying the speed of the engine;
   a motor operatively connected to said engine and driven thereby;
   a power takeoff shaft driven by said motor;
   a manually adjustable control for said motor and movable from a neutral position through an intermediate range of positions to an end position;
   motor control means responsive to the position of said manually adjustable control, said motor control means including first means for interrupting operation of said motor when said manually adjustable control is in said neutral position, second means for causing said motor to drive said power takeoff shaft at a speed dependent upon the speed of the engine when said manually adjustable control is in said intermediate range of positions, the ratio of the speed of said shaft to the speed of the engine being dependent upon the position of said manually adjustable control in said intermediate range of positions, and third means for causing said motor to operate said shaft at a predetermined speed regardless of the speed of the engine as long as the engine speed is adequate to maintain said speed, when said manually adjustable control is in said end position;
   further means effective upon actuation thereof to interrupt operation of said motor regardless of the position of said manually adjustable control; and
   means for preventing resumption of the operation of said motor following such an interruption until said manually adjustable control has been returned to said neutral position.

2. The combination of claim 1 in which said motor is a hydraulic motor which is operatively connected to said engine through a hydraulic pump driven by said engine and supplying hydraulic fluid to said hydraulic motor.

3. The combination of claim 2 in which there is a device responsive to the pressure of the fluid supplied to said hydraulic motor and means controlled thereby for causing said motor control means to terminate the supply of hydraulic fluid to said motor by said pump whenever the pressure of such fluid exceeds a predetermined value indicative of an excessive load on said motor.

4. The combination of claim 3 in which there is an indicator in said operator's compartment to indicate when the supply of fluid to said motor by said pump has been terminated because of the pressure of such fluid exceeding said predetermined value.

5. The combination of claim 2 in which there is means responsive to the temperature of the fluid and means controlled thereby for causing said motor control means to terminate the supply of hydraulic fluid to said motor by said pump whenever the temperature of said fluid exceeds a predetermined value.

6. The combination of claim 2 in which there is means responsive to the pressure in the pump and which is effective when such pressure falls below a predetermined value to actuate an engine control to terminate operation of the engine.

7. The combination of claim 2 in which said pump is a variable displacement pump having a swash plate which is variably positioned to vary the output of said motor and hence the speed of said motor.

8. The combination of claim 1 in which the further means to interrupt operation of said motor is a manually positionable control and means controlled thereby for causing said motor control means to interrupt operation of said motor when said manually positionable control is actuated.

9. The combination of claim 8 in which said motor control means includes electric circuitry and in which said manually positionable control is a switch.

10. The combination of claim 8 in which said manually positionable control is adjacent said power takeoff shaft.

11. The combination of claim 8 in which said manually positionable control is secured to the end of a cable so that said control may be at a point remote from said power takeoff shaft.

12. The combination of claim 1 in which there is a maximum speed selecting control movable between two positions corresponding to two desired maximum values of said predetermined speed of said power takeoff shaft and means connecting said selecting control to said motor control means and said speed responsive means to cause said motor to operate said shaft at either of said two desired maximum speeds, depending upon the position of said speed selecting means, when said manually adjustable control is in said end position.

13. The combination of claim 12 in which said maximum speed selecting control is located adjacent said power takeoff shaft and in which there is an indicator in said operator's compartment for indicating which maximum speed has been selected.

14. The combination of claim 1 in which said manually adjustable control is movable from said neutral position in a direction opposite to said intermediate range of positions and in which said motor control means is effective when said manually adjustable control is moved in such opposite direction to cause said motor to drive said power takeoff shaft in a direction opposite to that in which it is driven when said manually adjustable control is in said intermediate range of positions.

15. The combination of claim 14 in which said motor drives said shaft at a lower speed for a given engine speed when said manually adjustable control has been moved in such opposite direction.

16. The combination of claim 1 in which there is an indicator in said operator's compartment and controlled by said speed responsive means for indicating the speed of said power takeoff shaft.

* * * * *